(12) United States Patent
Garrett et al.

(10) Patent No.: US 9,864,676 B2
(45) Date of Patent: *Jan. 9, 2018

(54) BOTTLENECK DETECTOR APPLICATION PROGRAMMING INTERFACE

(71) Applicant: Microsoft Technology Licensing, LLC, Redmond, WA (US)

(72) Inventors: Charles D. Garrett, Woodinville, WA (US); Christopher W. Fraser, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 211 days.

This patent is subject to a terminal disclaimer.

(21) Appl. No.: 14/821,352

(22) Filed: Aug. 7, 2015

(65) Prior Publication Data

US 2015/0347268 A1    Dec. 3, 2015

Related U.S. Application Data

(63) Continuation of application No. 13/866,020, filed on Apr. 18, 2013, now abandoned.
(Continued)

(51) Int. Cl.
*G06F 11/00* (2006.01)
*G06F 11/36* (2006.01)
(Continued)

(52) U.S. Cl.
CPC .......... *G06F 11/3688* (2013.01); *G06F 8/443* (2013.01); *G06F 8/70* (2013.01);
(Continued)

(58) Field of Classification Search
CPC ........ G06F 8/443; G06F 8/70; G06F 11/1471; G06F 11/323; G06F 11/3466;
(Continued)

(56) References Cited

U.S. PATENT DOCUMENTS 4,907,151 A    3/1990  Bartlett
5,369,570 A    11/1994 Parad
(Continued)

OTHER PUBLICATIONS

U.S. Appl. No. 61/801,298, filed Mar. 15, 2013, Li et al.
(Continued)

*Primary Examiner* — Joshua P Lottich
(74) *Attorney, Agent, or Firm* — Workman Nydegger

(57) ABSTRACT

An application programming interface may receive workload identifiers and checkpoint identifiers from which bottleneck detection may be performed. Workloads may be tracked through various checkpoints in an application and timestamps collected at each checkpoint. From these data, bottlenecks may be identified in real time or by analyzing the data in a subsequent analysis. The workloads may be processed by multiple devices which may comprise a large application. In some cases, the workloads may be processed by different devices in sequence or in a serial fashion, while in other cases workloads may be processed in parallel by different devices. The application programming interface may be part of a bottleneck detection service which may be sold on a pay-per-use model, a subscription model, or some other payment scheme.

24 Claims, 8 Drawing Sheets

Related U.S. Application Data

(60) Provisional application No. 61/801,298, filed on Mar. 15, 2013.

(51) Int. Cl.

| | | |
|---|---|---|
| *H04L 12/26* | (2006.01) | |
| *G06F 9/50* | (2006.01) | |
| *G06F 11/34* | (2006.01) | |
| *G06F 11/14* | (2006.01) | |
| *G06F 9/45* | (2006.01) | |
| *G06F 11/32* | (2006.01) | |
| *G06F 9/46* | (2006.01) | |
| *G06F 9/44* | (2006.01) | |

(52) U.S. Cl.
CPC .............. *G06F 9/46* (2013.01); *G06F 9/505* (2013.01); *G06F 11/1471* (2013.01); *G06F 11/323* (2013.01); *G06F 11/3466* (2013.01); *G06F 11/3495* (2013.01); *G06F 11/3612* (2013.01); *G06F 11/3636* (2013.01); *H04L 43/00* (2013.01); *G06F 11/3409* (2013.01); *G06F 11/3414* (2013.01); *G06F 11/3624* (2013.01); *G06F 2201/805* (2013.01); *G06F 2201/84* (2013.01); *G06F 2201/865* (2013.01); *G06F 2201/88* (2013.01)

(58) Field of Classification Search
CPC ............. G06F 11/3495; G06F 11/3612; G06F 11/3624; G06F 11/3636; G06F 2201/84; G06F 2201/865

See application file for complete search history.

(56) References Cited

U.S. PATENT DOCUMENTS

| | | | |
|---|---|---|---|
| 5,535,393 A | 7/1996 | Reeve et al. | |
| 5,606,688 A | 2/1997 | McNutt et al. | |
| 5,815,720 A | 9/1998 | Buzbee | |
| 5,854,928 A | 12/1998 | Buzbee | |
| 5,915,114 A | 6/1999 | McKee et al. | |
| 5,937,194 A | 8/1999 | Sundaresan | |
| 5,953,736 A | 9/1999 | O'Conner et al. | |
| 5,978,830 A | 11/1999 | Nakaya et al. | |
| 6,059,842 A | 5/2000 | Dumarot et al. | |
| 6,158,049 A | 12/2000 | Goodwin et al. | |
| 6,195,676 B1 | 2/2001 | Spix et al. | |
| 6,275,981 B1 | 8/2001 | Buzbee et al. | |
| 6,321,204 B1 | 11/2001 | Kazami et al. | |
| 6,321,240 B1 | 11/2001 | Chilimbi et al. | |
| 6,381,735 B1 | 4/2002 | Hunt | |
| 6,584,487 B1 | 6/2003 | Saboff | |
| 6,598,141 B1 | 7/2003 | Dussud et al. | |
| 6,735,687 B1 | 5/2004 | Kok | |
| 6,826,752 B1 | 11/2004 | Thornley et al. | |
| 6,856,950 B1 | 2/2005 | Abts et al. | |
| 6,862,729 B1 | 3/2005 | Kuch et al. | |
| 6,970,805 B1 | 11/2005 | Bierma et al. | |
| 7,065,763 B1 | 6/2006 | Martin et al. | |
| 7,143,412 B2 | 11/2006 | Koenen | |
| 7,343,598 B2 | 3/2008 | Chilimbi et al. | |
| 7,430,733 B1 | 9/2008 | Yaari | |
| 7,493,400 B2 | 2/2009 | Loaiza et al. | |
| 7,500,216 B1 | 3/2009 | Blunno et al. | |
| 7,580,905 B2 | 8/2009 | Lopez-Estrada | |
| 7,681,182 B1 | 3/2010 | Mistry et al. | |
| 7,681,188 B1 | 3/2010 | Tirumalai et al. | |
| 7,954,095 B2 | 5/2011 | Archer et al. | |
| 8,037,465 B2 | 10/2011 | Tian et al. | |
| 8,132,162 B2 | 3/2012 | Peterson | |
| 8,234,105 B1 | 7/2012 | Aldrich et al. | |
| 8,316,355 B2 | 11/2012 | Feng et al. | |
| 8,336,056 B1 | 12/2012 | Gadir | |
| 8,495,598 B2 | 7/2013 | Gounares et al. | |
| 8,543,907 B1 | 9/2013 | Roskind | |
| 8,566,804 B1 | 10/2013 | Carrick et al. | |
| 8,595,743 B2 | 11/2013 | Gounares et al. | |
| 8,607,018 B2 | 12/2013 | Gounares et al. | |
| 8,615,766 B2 | 12/2013 | Gounares | |
| 8,650,538 B2 | 2/2014 | Gounares | |
| 8,656,134 B2 | 2/2014 | Gounares et al. | |
| 8,656,135 B2 | 2/2014 | Gounares et al. | |
| 8,656,378 B2 | 2/2014 | Gounares et al. | |
| 8,694,574 B2 | 4/2014 | Gounares et al. | |
| 8,700,838 B2 | 4/2014 | Gounares | |
| 8,707,326 B2 | 4/2014 | Garrett | |
| 8,726,255 B2 | 5/2014 | Gounares et al. | |
| 8,752,021 B2 | 6/2014 | Li et al. | |
| 8,752,034 B2 | 6/2014 | Gounares et al. | |
| 8,789,030 B2 | 7/2014 | Gounares et al. | |
| 8,789,032 B1 | 7/2014 | Li et al. | |
| 8,793,669 B2 | 7/2014 | Garrett | |
| 2001/0003822 A1 | 6/2001 | Hibi et al. | |
| 2001/0056456 A1 | 12/2001 | Cota-Robles | |
| 2002/0019887 A1 | 2/2002 | Moore | |
| 2002/0072830 A1 | 6/2002 | Hunt | |
| 2002/0165901 A1 | 11/2002 | Rajan et al. | |
| 2002/0196184 A1 | 12/2002 | Johnson et al. | |
| 2002/0199179 A1 | 12/2002 | Lavery et al. | |
| 2003/0023576 A1 | 1/2003 | Gilson | |
| 2003/0056201 A1 | 3/2003 | Degenaro et al. | |
| 2003/0070161 A1 | 4/2003 | Wong et al. | |
| 2003/0088606 A1 | 5/2003 | Miller et al. | |
| 2003/0093408 A1 | 5/2003 | Brown et al. | |
| 2003/0145314 A1 | 7/2003 | Nguyen et al. | |
| 2004/0015600 A1 | 1/2004 | Tiwary et al. | |
| 2004/0054992 A1 | 3/2004 | Nair et al. | |
| 2004/0088699 A1 | 5/2004 | Suresh | |
| 2004/0103410 A1 | 5/2004 | Sakai | |
| 2004/0154019 A1 | 8/2004 | Aamodt et al. | |
| 2004/0194098 A1 | 9/2004 | Chung et al. | |
| 2004/0205718 A1 | 10/2004 | Reynders | |
| 2004/0225443 A1 | 11/2004 | Kamps | |
| 2005/0041692 A1 | 2/2005 | Kallstenius | |
| 2005/0066149 A1 | 3/2005 | Kanade | |
| 2005/0131995 A1 | 6/2005 | Chase et al. | |
| 2005/0149697 A1 | 7/2005 | Enright et al. | |
| 2005/0149912 A1 | 7/2005 | Farcy et al. | |
| 2005/0177836 A1 | 8/2005 | Lari et al. | |
| 2005/0234974 A1 | 10/2005 | Bailey et al. | |
| 2005/0240567 A1 | 10/2005 | Klosterhalfen | |
| 2006/0005179 A1 | 1/2006 | Kawahara et al. | |
| 2006/0005194 A1 | 1/2006 | Kawahara et al. | |
| 2006/0013134 A1 | 1/2006 | Neuse | |
| 2006/0101033 A1 | 5/2006 | Hu et al. | |
| 2006/0101467 A1 | 5/2006 | Buco et al. | |
| 2006/0106926 A1 | 5/2006 | Kato et al. | |
| 2006/0168583 A1 | 7/2006 | Basso et al. | |
| 2006/0179429 A1 | 8/2006 | Eggers et al. | |
| 2006/0256805 A1 | 11/2006 | Cho et al. | |
| 2007/0006159 A1 | 1/2007 | Hecht et al. | |
| 2007/0079298 A1 | 4/2007 | Tian et al. | |
| 2007/0150895 A1 | 6/2007 | Kurland | |
| 2007/0157177 A1 | 7/2007 | Bouguet et al. | |
| 2007/0168635 A1 | 7/2007 | Allen et al. | |
| 2007/0169002 A1 | 7/2007 | Kronlund et al. | |
| 2007/0169042 A1 | 7/2007 | Janczewski | |
| 2007/0214333 A1 | 9/2007 | Nijhawan et al. | |
| 2007/0220513 A1 | 9/2007 | Hwang | |
| 2007/0226696 A1 | 9/2007 | Radhakrishnan et al. | |
| 2007/0226700 A1 | 9/2007 | Gal et al. | |
| 2007/0234002 A1 | 10/2007 | Litke | |
| 2007/0277056 A1 | 11/2007 | Varadarajan et al. | |
| 2008/0022285 A1 | 1/2008 | Cherkasova et al. | |
| 2008/0022286 A1 | 1/2008 | Chung et al. | |
| 2008/0092128 A1 | 4/2008 | Corry et al. | |
| 2008/0098180 A1 | 4/2008 | Larson et al. | |
| 2008/0104362 A1 | 5/2008 | Buros et al. | |
| 2008/0117216 A1 | 5/2008 | Dorie | |
| 2008/0127116 A1 | 5/2008 | Kosche et al. | |
| 2008/0127149 A1 | 5/2008 | Kosche et al. | |
| 2008/0163183 A1 | 7/2008 | Li et al. | |
| 2008/0243970 A1 | 10/2008 | Schmelter et al. | |

(56) References Cited

U.S. PATENT DOCUMENTS

| | | |
|---|---|---|
| 2008/0288741 A1 | 11/2008 | Lee et al. |
| 2009/0019449 A1 | 1/2009 | Choi et al. |
| 2009/0125519 A1 | 5/2009 | Robison et al. |
| 2009/0165016 A1 | 6/2009 | Bell, Jr. et al. |
| 2009/0177642 A1 | 7/2009 | Chung et al. |
| 2009/0193402 A1 | 7/2009 | Bashkansky et al. |
| 2009/0313600 A1 | 12/2009 | Ayers et al. |
| 2010/0049941 A1 | 2/2010 | Howard |
| 2010/0106920 A1 | 4/2010 | Anckaert et al. |
| 2010/0115172 A1 | 5/2010 | Gillingham et al. |
| 2010/0123717 A1 | 5/2010 | Jiao |
| 2010/0125565 A1 | 5/2010 | Burger et al. |
| 2010/0125838 A1 | 5/2010 | Kuusilinna et al. |
| 2010/0131945 A1 | 5/2010 | Zeort |
| 2010/0146489 A1 | 6/2010 | Ortiz |
| 2010/0268816 A1 | 10/2010 | Tarui et al. |
| 2010/0299671 A1 | 11/2010 | Kinsey |
| 2011/0072420 A1 | 3/2011 | Cha et al. |
| 2011/0088021 A1 | 4/2011 | Kruglick |
| 2011/0088038 A1 | 4/2011 | Kruglick |
| 2011/0154289 A1 | 6/2011 | Mannarswamy et al. |
| 2011/0154300 A1 | 6/2011 | Rao et al. |
| 2011/0202907 A1 | 8/2011 | Dice et al. |
| 2011/0258608 A1 | 10/2011 | Li et al. |
| 2011/0258611 A1 | 10/2011 | Dutta et al. |
| 2011/0283263 A1 | 11/2011 | Gagliardi et al. |
| 2011/0289485 A1 | 11/2011 | Mejdrich et al. |
| 2011/0314448 A1 | 12/2011 | Biggerstaff et al. |
| 2012/0011519 A1 | 1/2012 | Ganesh |
| 2012/0159091 A1 | 6/2012 | Li et al. |
| 2012/0159116 A1 | 6/2012 | Lim et al. |
| 2012/0197868 A1 | 8/2012 | Fauser et al. |
| 2012/0222019 A1 | 8/2012 | Gounares et al. |
| 2012/0222043 A1 | 8/2012 | Gounares et al. |
| 2012/0227040 A1 | 9/2012 | Gounares |
| 2012/0233310 A1 | 9/2012 | Agarwala et al. |
| 2012/0233592 A1 | 9/2012 | Gounares |
| 2012/0233601 A1 | 9/2012 | Gounares et al. |
| 2012/0254266 A1 | 10/2012 | Printezis et al. |
| 2012/0278594 A1 | 11/2012 | Kumar et al. |
| 2012/0317371 A1 | 12/2012 | Gounares et al. |
| 2012/0317389 A1 | 12/2012 | Gounares et al. |
| 2012/0317421 A1 | 12/2012 | Gounares et al. |
| 2012/0317556 A1 | 12/2012 | Zhu et al. |
| 2012/0317557 A1 | 12/2012 | Garrett et al. |
| 2012/0317577 A1 | 12/2012 | Garrett et al. |
| 2012/0317587 A1 | 12/2012 | Garrett et al. |
| 2012/0324454 A1 | 12/2012 | Gounares et al. |
| 2013/0042156 A1 | 2/2013 | Srinivasan et al. |
| 2013/0067445 A1 | 3/2013 | Gounares et al. |
| 2013/0073523 A1 | 3/2013 | Gounares et al. |
| 2013/0073604 A1 | 3/2013 | Gounares et al. |
| 2013/0073829 A1 | 3/2013 | Gounares et al. |
| 2013/0073837 A1 | 3/2013 | Li et al. |
| 2013/0074049 A1 | 3/2013 | Gounares et al. |
| 2013/0074055 A1 | 3/2013 | Gounares et al. |
| 2013/0074056 A1 | 3/2013 | Gounares et al. |
| 2013/0074057 A1 | 3/2013 | Gounares et al. |
| 2013/0074058 A1 | 3/2013 | Gounares et al. |
| 2013/0074092 A1 | 3/2013 | Gounares et al. |
| 2013/0074093 A1 | 3/2013 | Gounares et al. |
| 2013/0080760 A1 | 3/2013 | Li et al. |
| 2013/0080761 A1 | 3/2013 | Garrett et al. |
| 2013/0081005 A1 | 3/2013 | Gounares et al. |
| 2013/0085882 A1 | 4/2013 | Gounares et al. |
| 2013/0086348 A1 | 4/2013 | Marathe et al. |
| 2013/0086564 A1 | 4/2013 | Felch |
| 2013/0091387 A1 | 4/2013 | Bohnet et al. |
| 2013/0117753 A1 | 5/2013 | Gounares et al. |
| 2013/0117759 A1 | 5/2013 | Gounares et al. |
| 2013/0139137 A1 | 5/2013 | Zhao |
| 2013/0166886 A1 | 6/2013 | Sasanka et al. |
| 2013/0198729 A1 | 8/2013 | Turner et al. |
| 2013/0212594 A1 | 8/2013 | Choi et al. |
| 2013/0219057 A1 | 8/2013 | Li et al. |
| 2013/0219372 A1 | 8/2013 | Li et al. |
| 2013/0227529 A1 | 8/2013 | Li et al. |
| 2013/0227536 A1 | 8/2013 | Li et al. |
| 2013/0229416 A1 | 9/2013 | Krajec et al. |
| 2013/0232174 A1 | 9/2013 | Krajec et al. |
| 2013/0232433 A1 | 9/2013 | Krajec et al. |
| 2013/0232452 A1 | 9/2013 | Krajec et al. |
| 2013/0282545 A1 | 10/2013 | Gounares et al. |
| 2013/0283102 A1 | 10/2013 | Krajec et al. |
| 2013/0283240 A1 | 10/2013 | Krajec et al. |
| 2013/0283241 A1 | 10/2013 | Krajec et al. |
| 2013/0283242 A1 | 10/2013 | Gounares |
| 2013/0283246 A1 | 10/2013 | Krajec et al. |
| 2013/0283247 A1 | 10/2013 | Krajec et al. |
| 2013/0283281 A1 | 10/2013 | Krajec et al. |
| 2013/0298112 A1 | 11/2013 | Gounares et al. |
| 2014/0013306 A1 | 1/2014 | Gounares et al. |
| 2014/0013308 A1 | 1/2014 | Gounares et al. |
| 2014/0013309 A1 | 1/2014 | Gounares |
| 2014/0013311 A1 | 1/2014 | Garrett et al. |
| 2014/0019598 A1 | 1/2014 | Krajec |
| 2014/0019756 A1 | 1/2014 | Krajec |
| 2014/0019879 A1 | 1/2014 | Krajec et al. |
| 2014/0019985 A1 | 1/2014 | Krajec |
| 2014/0025572 A1 | 1/2014 | Krajec |
| 2014/0026142 A1 | 1/2014 | Gounares et al. |
| 2014/0040591 A1 | 2/2014 | Gounares |
| 2014/0109101 A1 | 4/2014 | Radhakrishnan et al. |
| 2014/0189650 A1 | 7/2014 | Gounares |
| 2014/0189651 A1 | 7/2014 | Gounares |
| 2014/0189652 A1 | 7/2014 | Gounares |
| 2014/0215443 A1 | 7/2014 | Voccio et al. |
| 2014/0278326 A1 | 9/2014 | Sharma et al. |
| 2014/0281726 A1 | 9/2014 | Garrett et al. |
| 2014/0282597 A1 | 9/2014 | Garrett et al. |
| 2015/0032971 A1 | 1/2015 | Tian et al. |
| 2015/0082285 A1 | 3/2015 | Li et al. |
| 2015/0205588 A1 | 7/2015 | Bates et al. |
| 2015/0331720 A1 | 11/2015 | Huetter et al. |

OTHER PUBLICATIONS

International Search Authority, International Search Report and Written Opinion, Korea Intellectual Property Office, PCT/US2013/073935, dated Mar. 31, 2014, 10047-03.

Dong, et al., "Hybrid Checkpointing Using Emerging Nonvolatile Memories for Future Exascale Systems", Oct. 2014, 10060-01.

Erik-Svensson, et al., "Mpreplay Architecture Support for Deterministic Replay of Message Passing Programs on Message Passing Many-core Processors", Sep. 2009, 10060-01.

Gerofi, et al., "Workload Adaptive Checkpoint Scheduling of Virtual Machine Replication", Dec. 2011, 10060-01.

International Search Authority, International Search Repor tand Written Opinion, Korea Intellectual Property Office, PCT/US2013/075876, dated Apr. 7, 2014, 10058-02.

Wu, et al., "Error Recovery in Shared Memory Multiprocessors Using Priavate Caches", Apr. 1990, 10060-01.

Narayanasamy, et al., "BugNet Continuously Recording Program Execution for Deterministic Replay Debugging", Jun. 2005, 12 pages.

U.S. Appl. No. 13/853,809, May 21, 2014, Office Action.
U.S. Appl. No. 13/853,769, May 9, 2014, Office Action.
U.S. Appl. No. 13/853,769, Jun. 22, 2015, Office Action.
U.S. Appl. No. 13/853,816, Feb. 25, 2015, Office Action.
U.S. Appl. No. 13/853,791, May 12, 2014, Office Action.
U.S. Appl. No. 13/853,791, Sep. 30, 2014, Office Action.
U.S. Appl. No. 13/853,791, Jan. 29, 2015, Office Action.
U.S. Appl. No. 13/853,791, Aug. 19, 2015, Office Action.
U.S. Appl. No. 13/866,014, Sep. 12, 2014, Office Action.
U.S. Appl. No. 13/866,014, Jan. 5, 2015, Office Action.
U.S. Appl. No. 13/866,020, Aug. 29, 2014, Office Action.
U.S. Appl. No. 13/866,020, Feb. 27, 2015, Office Action.
U.S. Appl. No. 13/866,022, Aug. 15, 2014, Office Action.
U.S. Appl. No. 13/866,022, Mar. 17, 2015, Office Action.

(56) References Cited

OTHER PUBLICATIONS

Notice of Allowance dated Sep. 12, 2016 cited in U.S. Appl. No. 13/853,816.
U.S. Appl. No. 13/866,014, Nov. 3, 2015, Notice of Allowance.
U.S. Appl. No. 13/866,022, Nov. 9, 2015, Notice of Allowance.
U.S. Appl. No. 13/853,791, Dec. 15, 2015, Office Action.
Office Action dated Jul. 8, 2014 cited in U.S. Appl. No. 13/853,769.
U.S. Appl. No. 13/853,769, Feb. 19, 2016, Office Action.
Office Action dated May 23, 2016 cited in U.S. Appl. No. 13/853,791.
Notice of Allowance dated Jun. 2, 2016 cited in U.S. Appl. No. 13/853,769.
U.S. Appl. No. 61/801,298, filed Mar. 15, 2013, Li et al.
U.S. Appl. No. 13/853,816, Sep. 9, 2015, Office Action.
U.S. Appl. No. 13/866,014, Aug. 28, 2015, Notice of Allowance.
U.S. Appl. No. 13/866,022, Sep. 8, 2015, Notice of Allowance.
"Final Office Action Issued in U.S Appl. No. 14/549,420", dated Oct. 30, 2017, 30 Pages.

BOTTLENECK DETECTOR APPLICATION PROGRAMMING INTERFACE

BACKGROUND

Computer applications often have bottlenecks that may limit the throughput or efficiency of an application. Often, bottlenecks may not be fully appreciated when the application code is being written and may only be noticeable when the code may be executed under load.

The bottlenecks may be an artifact of the application design, poor programming technique, or may be the result of outside constraints on an application. When a bottleneck may be identified, a programmer may be able to investigate the bottleneck and rewrite or otherwise improve the code to increase application performance.

SUMMARY

A bottleneck detector may analyze individual workloads processed by an application by logging times when the workload may be processed at different checkpoints in the application. For each checkpoint, a curve fitting algorithm may be applied, and the fitted curves may be compared between different checkpoints to identify bottlenecks or other poorly performing sections of the application. A real time implementation of a detection system may compare newly captured data points against historical curves to detect a shift in the curve, which may indicate a bottleneck. In some cases, the fitted curves from neighboring checkpoints may be compared to identify sections of the application that may be a bottleneck. An automated system may apply one set of checkpoints in an application, identify an area for further investigation, and apply a second set of checkpoints in the identified area. Such a system may recursively search for bottlenecks in an executing application.

An application programming interface may receive workload identifiers and checkpoint identifiers from which bottleneck detection may be performed. Workloads may be tracked through various checkpoints in an application and timestamps collected at each checkpoint. From these data, bottlenecks may be identified in real time or by analyzing the data in a subsequent analysis. The workloads may be processed by multiple devices which may comprise a large application. In some cases, the workloads may be processed by different devices in sequence or in a serial fashion, while in other cases workloads may be processed in parallel by different devices. The application programming interface may be part of a bottleneck detection service which may be sold on a pay-per-use model, a subscription model, or some other payment scheme.

A bottleneck detector may use an iterative method to identify a bottleneck with specificity. An automated checkpoint inserter may place checkpoints in an application. When a bottleneck is detected in an area of an application, the first set of checkpoints may be removed and a new set of checkpoints may be placed in the area of the bottleneck. The process may iterate until a bottleneck may be identified with enough specificity to aid a developer or administrator of an application. In some cases, the process may identify a specific function or line of code where a bottleneck occurs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Bottleneck Detection Using Timestamps

Figure 1:
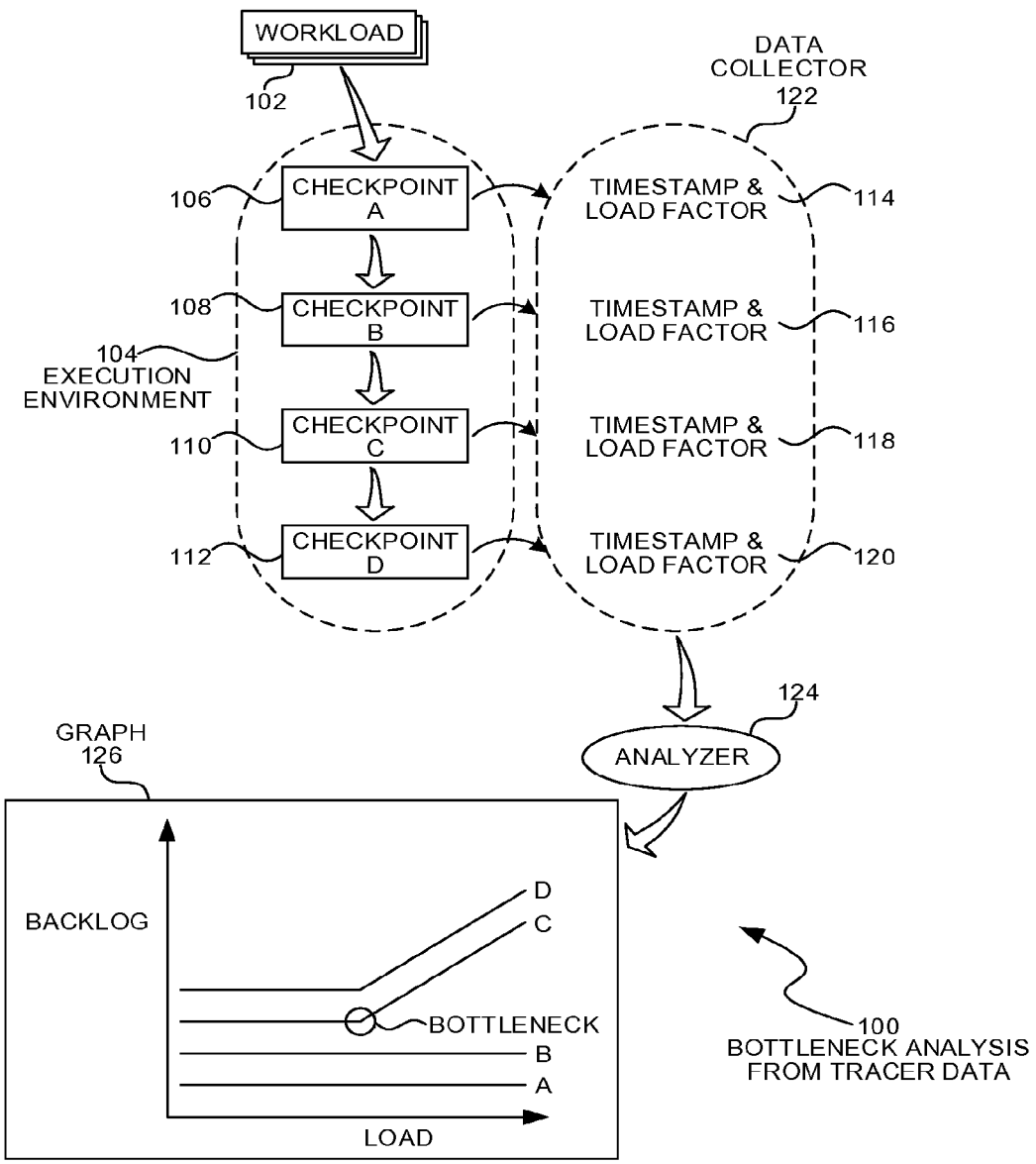
FIG. 1 is a diagram illustration of an embodiment showing a method for performing bottleneck analysis.

Bottlenecks in executing programs may be identified by analyzing the timestamps taken as workloads pass certain checkpoints. A bottleneck may be identified when the time to execute a workload between two checkpoints increases at a greater rate than the load increases.

A bottleneck detector may capture timestamps as workloads pass checkpoints within an application, then analyze the timestamps to identify bottlenecks. The workloads may be any type of memory object, message, process, thread, or other application element that may be operated upon through a sequence of operations. Throughout the course of the workload, various checkpoints may be placed to track the progress of the workload. For each workload, a sequence of timestamps may be collected for each of the checkpoints that the workload may pass.

In a lightly loaded application, each workload may typically be executed in approximately the same elapsed time. As the load increases to the point where a bottleneck may occur, workloads may take an increasing amount of time at a bottleneck.

In a simple analogy, workloads may be visualized as cars travelling on a multilane highway. When there is very little traffic, each car may pass mile posts at approximately the same time from the previous mile post. If there was a bottleneck in the highway, due to construction or an accident, the number of lanes may constrict, forcing the cars to slow down through the bottleneck. In such a case, the time from one mile post to another for each car that may pass through the bottleneck may increase. This effect may be measured and detected as a bottleneck.

The timestamps may be taken at various locations within an application. In some cases, an application may be decorated with function calls that may transmit a workload identifier and capture a timestamp for each checkpoint. The function calls may be placed throughout an application to track a workload's progress through the application. In such an embodiment, the executable code for an application may be changed to include the checkpoint function calls. Such embodiments may make such changes in source code, intermediate code, binary code, or other phases of an application.

In some embodiments, an instrumented execution environment may identify checkpoints and set events at each checkpoint to capture timestamp data. In such embodiments, the checkpoints may be created and managed without changing the executable code of an application. Such embodiments may have an identification system for creating and setting the checkpoints, as well as a detection and collection system that may detect the checkpoint and collect related data.

The application may operate on a single device or across multiple devices. In a single device embodiment, the application may execute on a single hardware platform, which may have multiple processors and various memory and peripheral components. In a single device embodiment, the device may have a clock from which timestamps may be taken.

In a multiple device application, the application may consist of similar or different software components that may operate on different devices. For example, some applications may operate in a computer cluster, where each device may execute a similar instance of an application to the other devices. In another example, several devices may process workloads in series, where one device may process a workload which may be passed to another device for additional processing. In such embodiments, a synchronized clock may be used to coordinate timestamps that may be gathered from multiple devices.

A bottleneck detection system may use various time series techniques for capturing, analyzing, and displaying bottleneck information in real time or near-real time. With each data collection event, a set of statistical parameters may be gathered and summed, which may enable other statistical analyses to be performed. The statistical parameters may be lightweight enough to be calculated and updated with minimal computer processing overhead, and a separate analysis routine may analyze the data for bottlenecks in an offline or near-real time basis.

Application Programming Interface for Bottleneck Detection

An application programming interface may receive workload identifiers and checkpoint identifiers from applications being analyzed for bottlenecks. The application programming interface may receive and store timestamped data. In some embodiments, the application programming interface may analyze and display the data in real time or near-real time. In other embodiments, a detailed analysis may be performed on historical data.

The application programming interface may operate in several different architectures. In one architecture, a programmer may add function calls within an application, where the function calls may communicate with an application programming interface locally or over a network connection. In another architecture, an execution environment may have alerts or other monitoring functions that may transmit information to the application programming interface when each checkpoint is reached. In some such architectures, the execution environment may be an integrated development environment with code editors, compilers, debugging tools, and other components.

The application programming interface may operate as a programmatic gateway to accept data in real time, and an accompanying analysis and rendering engines may identify bottlenecks and may generate visualizations of the data. In some cases, the analysis engines may identify bottlenecks automatically and generate an alert or other report. In other cases, the analysis engine may generate graphs or other visualizations that may be displayed as data are received or using a secondary analysis.

The application programming interface may be one component of a paid service for application developers. The service may be a subscription based service, pay-per-use service, or have some other payment mechanism.

Automatic Bottleneck Detection with Automated Checkpoint Selection

An automated bottleneck detection system may use a recursive mechanism to isolate and identify a bottleneck in an application. A first set of checkpoints may be used to identify a portion of an application that contains a bottleneck, then a second set of checkpoints may be deployed within the identified portion. From analysis of the second set of checkpoints, the location of a bottleneck may be refined. Such a process may iterate until a bottleneck is defined with a high degree of specificity.

An automated bottleneck detection system may include an automated mechanism for identifying and placing checkpoints in an application. In some embodiments, such a mechanism may insert function calls or otherwise decorate an application in source code, intermediate code, binary code, or some other form. In some cases, an automated bottleneck detection system may attempt to identify natural breaks or other elements in an application into which to insert checkpoints. In some cases, an automated mechanism for inserting checkpoints may place checkpoints at locations that may not be natural breaks.

In some cases, an automated bottleneck detection system may use a set of predefined checkpoint function calls that may be inserted automatically or inserted by a programmer. In such embodiments, the automated bottleneck detection system may turn on a first subset of checkpoint function calls, identify the general area of a bottleneck, then turn on a second subset of checkpoint function calls that are nearer to the bottleneck to home in on the bottleneck location.

Throughout this specification and claims, the terms "profiler", "tracer", and "instrumentation" are used interchangeably. These terms refer to any mechanism that may collect data when an application is executed. In a classic definition, "instrumentation" may refer to stubs, hooks, or other data collection mechanisms that may be inserted into executable code and thereby change the executable code, whereas "profiler" or "tracer" may classically refer to data collection mechanisms that may not change the executable code. The use of any of these terms and their derivatives may implicate or imply the other. For example, data collection using a "tracer" may be performed using non-contact data collection in the classic sense of a "tracer" as well as data collection using the classic definition of "instrumentation" where the executable code may be changed. Similarly, data collected through "instrumentation" may include data collection using non-contact data collection mechanisms.

Further, data collected through "profiling", "tracing", and "instrumentation" may include any type of data that may be collected, including performance related data such as processing times, throughput, performance counters, and the like. The collected data may include function names, parameters passed, memory object names and contents, messages passed, message contents, registry settings, register contents, error flags, interrupts, or any other parameter or other collectable data regarding an application being traced.

Throughout this specification and claims, the term "execution environment" may be used to refer to any type of supporting software used to execute an application. An example of an execution environment is an operating system. In some illustrations, an "execution environment" may be shown separately from an operating system. This may be to illustrate a virtual machine, such as a process virtual machine, that provides various support functions for an application. In other embodiments, a virtual machine may be a system virtual machine that may include its own internal operating system and may simulate an entire computer system. Throughout this specification and claims, the term "execution environment" includes operating systems and other systems that may or may not have readily identifiable "virtual machines" or other supporting software.

Throughout this specification, like reference numbers signify the same elements throughout the description of the figures.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a bottleneck detection mechanism in its operational parts. Embodiment 100 is merely one example of a bottleneck detection system that may be performed on an application.

A set of workloads 102 may be executed by an application in an execution environment 104. The workloads may be any units of work that may be traced, tracked, or otherwise monitored on a series of checkpoints. As each workload 102 is executed, the various checkpoints 106, 108, 110, and 112 may capture a respective set of timestamps 114, 116, 118, and 120. The timestamps may include load factors and other data.

A data collector 122 may gather and transmit the data to an analyzer 124, which may generate a graph 126 or provide other output. In some cases, the analyzer 124 may produce output in real time, while in other cases, the analyzer 124 may process the various data elements after collection has completed.

The bottleneck detection of embodiment 100 may identify bottlenecks by measuring the difference in timestamps between various checkpoints for each workload. A bottleneck may be identified when the time difference between two checkpoints grows for each successive workload. In such a condition, the downstream process may be processing fewer workloads than may be coming in, causing the bottleneck.

The workloads may be any unit of work that may be tracked through an application. In some cases, the unit of work may be captured in a data item that may be passed from one portion of executable code to another. In other cases, the unit of work may be a process, transaction, thread, or other executable or data element that may undergo transformations or changes by several portions of an application.

In some embodiments, the workloads may be passed from one device to another. For example, a high performance computing environment may use message passing to transmit workloads from one device to another. Other systems, such as computer cluster arrangements, may use multiple devices to handle workloads in parallel or in series.

The workloads may or may not be independent of each other. In some embodiments, the workloads may be clearly delineated and independent. Other embodiments may have workloads that may interact with each other or are not fully independent. In many cases, a more reliable bottleneck detection may occur with independent workloads.

At each checkpoint, a timestamp and workload identifier may be captured. In many embodiments, a load factor and other data may also be gathered. The timestamp may be a 'wall clock' time that may reflect the actual time a checkpoint may have been encountered. Such a timestamp may be useful in cases where a workload may be processed by multiple devices.

In some embodiments, the timestamp may be an elapsed time from some designated start time. For example, some embodiments may start a clock when a workload encounters a first checkpoint, then collect elapsed time from the first checkpoint for each subsequent checkpoint. Other embodiments may determine elapsed time from the preceding checkpoint.

With each checkpoint and timestamp, a workload identifier may be captured. The workload identifier may be a mechanism to link subsequent checkpoint timestamps to each other. In some cases, a workload identifier may have a natural and meaningful name. In other cases, an arbitrary name may be assigned to workloads, one example of which may be to assign consecutive numbers as workload identifiers.

A load factor may be collected with the timestamp. The load factor may be any indicator for the 'busy-ness' or amount of work attempting to be processed by a system. In some embodiments, the load factor may be collected by a different data collection mechanism and matched to the data collected from the checkpoints by the timestamps or other mechanism. For example, a load factor may be a network traffic metric gathered from a network interface, a processor use metric collected from a hardware counter or other monitoring system.

The load factor may be implied in some embodiments. For example, a load factor may be inferred from the number of workload items being processed at a given time, or by the rate at which work items may be received by the system.

The analyzer 124 may organize the data by checkpoint and may create a time series representing the time lag between a baseline time and the checkpoint timestamp for each workload. Such a time series may be analyzed to determine when the values grow. In a non-bottleneck steady state, such a time series would be expected to be a flat, straight line. When a bottleneck occurs, the values in such a time series would be expected to grow.

The growth in the time series values may be linear or non-linear, depending on the application. Some embodiments may monitor the checkpoint data in real time and, using time series analyses, may evaluate the data stream to determine when the data stream has deviated from an expected constant value.

In many embodiments, such an analysis may take into consideration the variance of the data. Some data sets may contain more noise than others, and the correlation coefficient or other metrics of noise may be different for each application. In general, the larger the variance in the data, the greater a deviation may be present before a bottleneck may be identified.

Figure 2:
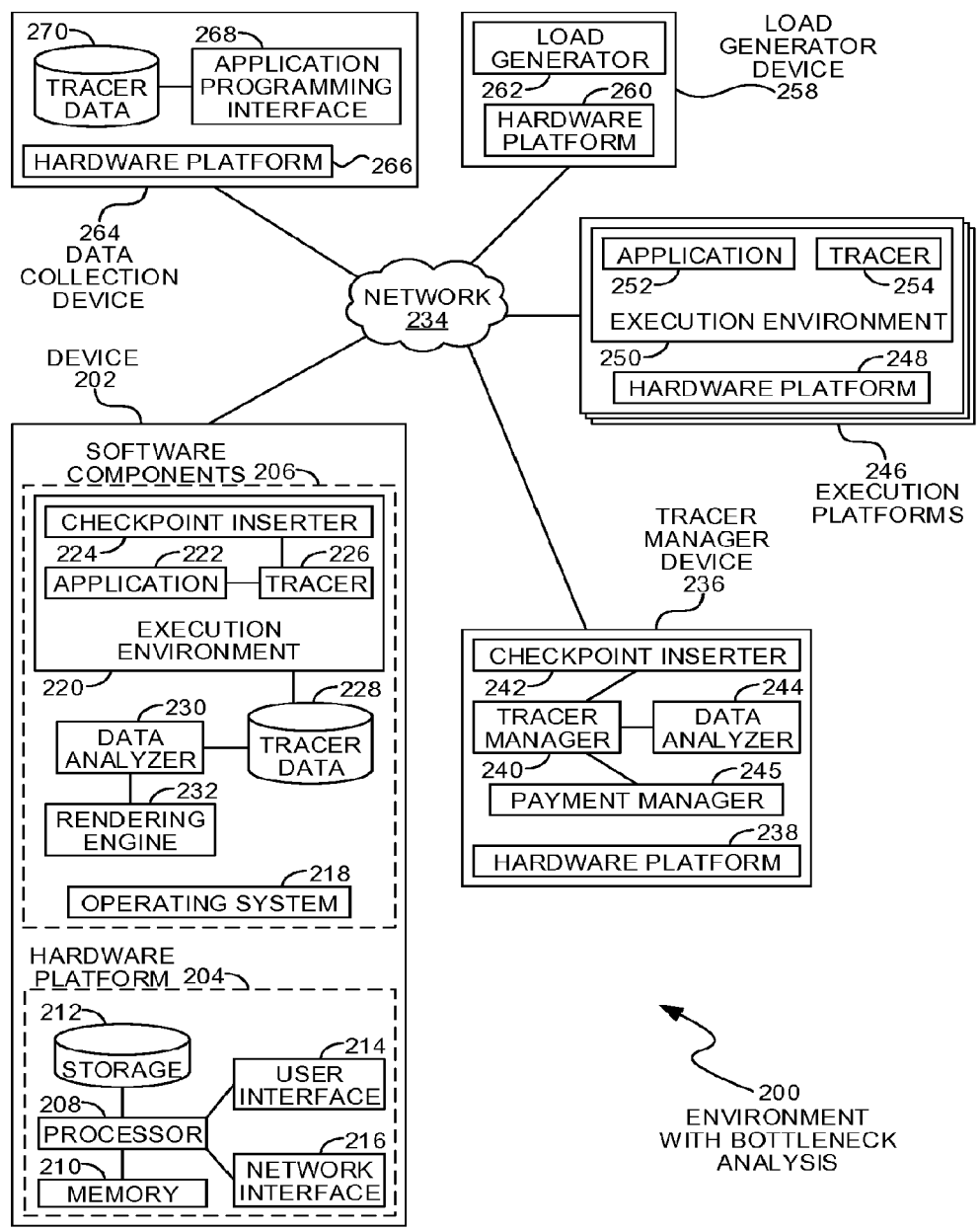
FIG. 2 is a diagram illustration of an embodiment showing a network environment with devices to perform bottleneck analysis.

FIG. 2 is a diagram of an embodiment 200 showing components that may perform bottleneck detection. Embodiment 200 contains a device 202 that may be a single device in which bottleneck detection may occur, as well as several devices that may perform bottleneck detection on a larger scale, including monitoring applications that execute over multiple devices.

A single device architecture may gather tracer data containing timestamps gathered at various checkpoints, analyze the data, and graphically display the data or perform bottleneck detection.

A multiple device architecture may divide different components of the data gathering, analysis, and management functions over different devices. The multiple device architecture may be one way to deliver an application programming interface that may detect bottlenecks from tracer data.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate. An operating system may provide an abstraction layer between executing routines and the hardware components 204, and may include various routines and functions that communicate directly with various hardware components.

An execution environment 220 may execute an application 222 and a tracer 226 may collect timestamps and other information at checkpoints in the application 222. The tracer 226 may store its output as tracer data 228.

The execution environment 220 may be any mechanism that may cause the application 222 to be executed and include a tracer 226 that may gather data at each checkpoint. In some embodiments, the execution environment 220 may be a virtual machine such as a process virtual machine or system virtual machine that may be instrumented with a tracer 226. In other embodiments, the execution environment 220 may be an integrated development environment that may include a code editor, compiler, debugging tools, and other functionality.

The tracer 226 may be any mechanism that may collect data at each checkpoint. In some cases, the tracer 226 may include function calls or other code that may be inserted into the executable code as binary code, intermediate code, or source code. In other cases, the tracer 226 may operate without modifying the executable code of the application 222.

A checkpoint inserter 224 may create checkpoints and cause the tracer 226 to collect data at the various checkpoints. In some cases, the checkpoint inserter 224 may decorate the application 222 with function calls or other tracer-related code. In other cases, the checkpoint inserter 224 may create checkpoints that may be monitored by the tracer 226 to collect the tracer data 228.

In some embodiments, the checkpoint inserter 224 may be a fully automated application part that may select checkpoints and cause the tracer 226 to execute at each checkpoint. In other embodiments, the checkpoint inserter 224 may have some user interface through which a human programmer may select locations for checkpoints, which may be automatically or manually inserted into an application.

A data analyzer 230 may receive the tracer data 228 to detect various bottlenecks. In some embodiments, the output of the data analyzer 230 may be transmitted to a rendering engine 232 to display graphical results.

In a network 234 environment, some embodiments may be deployed over multiple devices.

A tracer manager device 236 may operate on a hardware platform 238, which may be similar to the hardware platform 204. In some cases, the various hardware platforms may include cloud based execution environments which may or may not have a notion of a computing 'device'.

A tracer manager 240 may manage the operations of a tracing system over multiple devices, such as applications that may be deployed on a clustered computer configuration or other multiple-device architecture. In such embodiments, the tracer manager 240 may coordinate execution of an application, tracers on each device, as well as load generators and other components. The tracer manager 240 may also control a checkpoint inserter 242 and data analyzer 244.

In some embodiments, the tracer manager 240 may operate bottleneck detection as a paid service. In such an embodiment, customers may pay for bottleneck detection analysis using a payment manager 245, which may charge on a subscription basis, a pay-per-use basis, or other mechanisms.

One or more execution platforms 246 may execute the application and may collect checkpoint data. The execution platforms 246 may each have a hardware platform 248 on which an execution environment 250 may run. Each application 252 may be identical instances of the same application or may be different components of a larger application. The tracers 254 may gather trace data when a checkpoint is reached.

A data collection device 264 may operate on a hardware platform 266 and may contain an application programming interface 268 that may receive data from the tracers 254 and store the tracer data 270 for analysis. The application programming interface 268 may receive data taken at each checkpoint occurrence, then store the data.

In some cases, the application programming interface 268 may perform some processing of the incoming data. For example, some embodiments may create a timestamp when a data element is received from a tracer 254. In another example, some embodiments may preprocess the incoming data into a format that may be further processed by an analysis engine.

The application programming interface 268 may be used by the tracer 226 that may operate on an embodiment with a single execution environment, as well as gathering data from multiple tracers 254 on multiple execution environments.

A load generator device 258 may operate on a hardware platform 260 and may have a load generator 262 application. The load generator 262 may create workloads that may be processed by an application. In some cases, such workloads may be artificial or fictitious workloads that may exercise the application so that bottlenecks may appear in the tracer data.

Figure 3A:
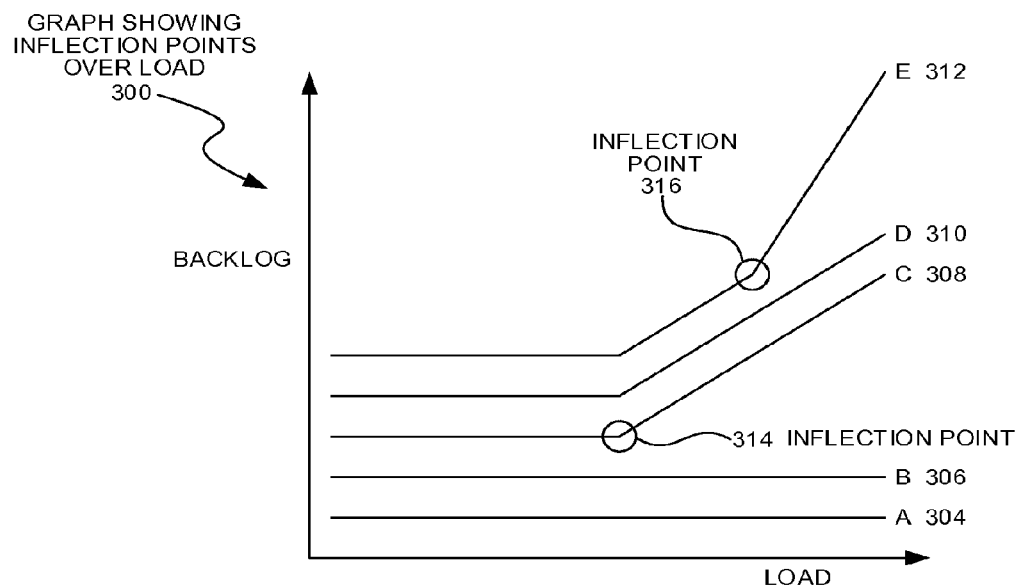
FIG. 3A is a diagram illustration of an example embodiment showing a backlog as a function of load for various checkpoints.

FIG. 3A is a diagram illustration of an example embodiment 300 showing a graph identifying inflection points as bottlenecks from trace data. Embodiment 300 illustrates a graph showing load on the X axis versus backlog on the Y axis.

The backlog may indicate the amount of time that a workload took to reach a given checkpoint. Five lines 304, 306, 308, 310, and 312 are shown in the graph, and each line may represent the backlog for a given checkpoint as a function of the load experienced by the system.

The graph of embodiment 300 may or may not reflect the sequence of workloads processed by an application, but instead may reflect measurements taken at different levels of loading. If the workload was applied in ever increasing amounts, the graph 300 may represent the backlog received over time, but in many cases, data used to generate a graph such as embodiment 300 may be gathered over many cycles of high, medium, and low loads.

In a normal situation where a checkpoint does not experience a bottleneck, the checkpoint lines may be horizontal lines, such as for checkpoints 304 and 306.

At a certain amount of load, checkpoint line 308 may diverge at the inflection point 314. The inflection point 314 may identify the load at which a bottleneck occurred, as well as identified that the bottleneck occurred between checkpoints 306 and 308. A programmer may be able to spot the inflection point 314 visually and investigate the bottleneck in the code between checkpoints 306 and 308.

As the load increases, a second inflection point 316 may indicate a second bottleneck that may occur between checkpoints 310 and 312. Again, a programmer may be able to investigate and attempt to address the bottleneck.

The graph of embodiment 300 may be created by mapping the elapsed time for each workload measured from an initial starting point. When such a measurement or calculation is performed, each checkpoint may be illustrated as a stacked line configuration, where the sequence of workflow may be from the bottom of the graph to the top.

The result of such a measurement may also yield lines that are parallel to each other. For example, checkpoint 310 remains parallel to checkpoint 308 after the inflection point 314. This indicates that the time between checkpoints 308 and 310 may not have changed even after the bottleneck was incurred. The rise of the checkpoint 310 may reflect the downstream effects of the bottleneck in checkpoint 308.

In some embodiments, the inflection points 314 and 316 may be identified through numerical analysis. Such numerical analysis may attempt to fit a curve to the data points, beginning with a straight line curve, and progressing to more complex curves. When the data may not fit a straight line curve, an analysis may attempt to find an inflection point by fitting two line segments. The correlation coefficient for each curve fitting step may be used as a measure of variance in the data as well as a metric for determining when a fitted curve is a sufficient match.

The analysis of checkpoint lines may involve comparing the slope of a linear curve fitting analysis, such as linear regression. In such analysis, a positive change in slope from one checkpoint line to a subsequent checkpoint line may indicate a bottleneck.

Figure 3B:
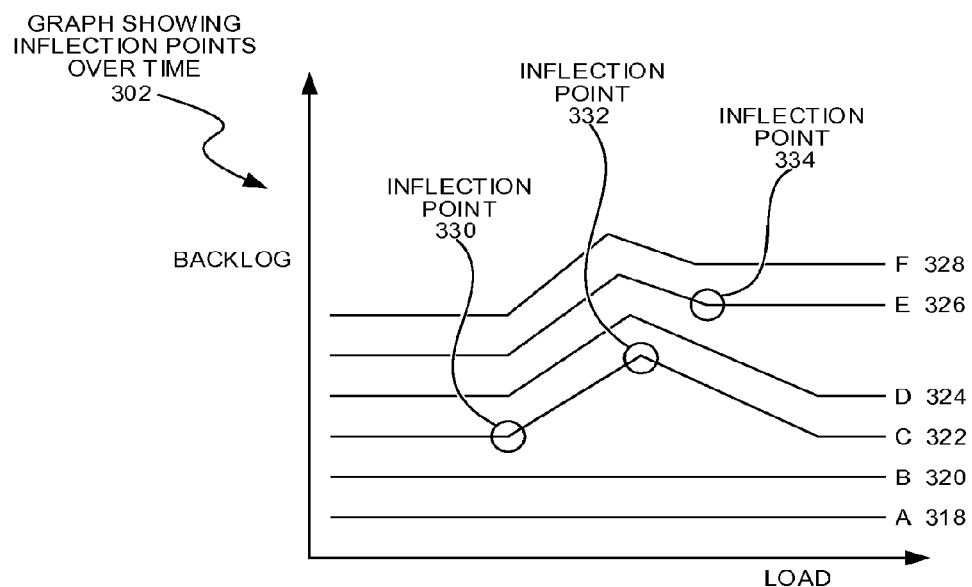
FIG. 3B is a diagram illustration of an example embodiment showing a backlog as a function of time for various checkpoints.

FIG. 3B is a diagram illustration of an example embodiment 302 showing a graph identifying inflection points as bottlenecks from trace data. Embodiment 302 illustrates a graph showing time on the X axis versus backlog on the Y axis. Embodiment 300 as described above represents load on the X axis, embodiment 302 illustrates a different graph with time on the X axis.

The backlog may indicate the amount of time that a workload took to reach a given checkpoint. Six lines 318, 320, 322, 324, 326, and 328 are shown in the graph, and each line may represent the backlog for a given checkpoint as a function of the time.

The graph of embodiment 302 may illustrate a system's response to increasing and decreasing loads. The amount of load is not shown in the graph, but the effects of load may be illustrated.

As with graph 300, checkpoints 318 and 320 illustrate checkpoints where no bottlenecks have been experienced. At inflection point 330, checkpoint 322 experienced a bottleneck that continues to build until inflection point 332, where the bottleneck recedes until the bottleneck dissipates. While that is occurring, checkpoint 326 experiences an inflection point 334, which indicates a second bottleneck. In the graph 302, the bottleneck of checkpoint 326 appears to build while the bottleneck of checkpoint 332 recedes.

Figure 3C:
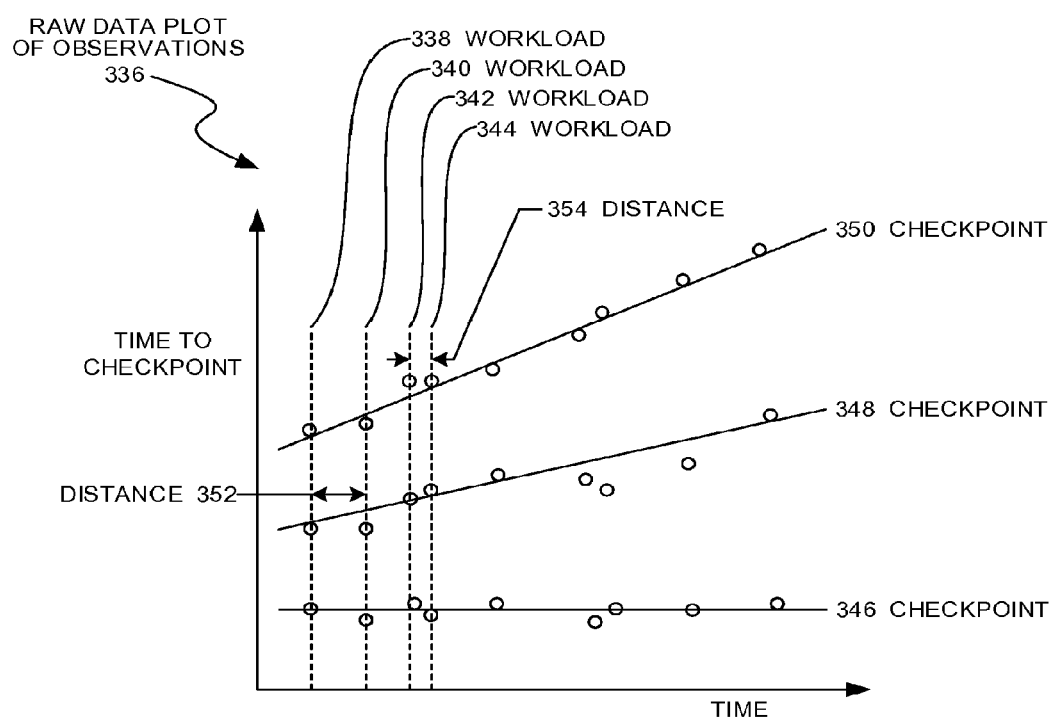
FIG. 3C is a diagram illustration of an example embodiment showing raw data of workloads passing various checkpoints.

FIG. 3C is a diagram illustration of an example embodiment 336 showing raw data that may be plotted on a graph. Embodiment 336 illustrates data for multiple workloads as those workloads are received, and the timestamps for each checkpoint for each workload.

The X axis may show datasets for individual workloads as organized by the start time for the workload. Workloads 338, 340, 342, and 344 are illustrated with data points indicating when the workloads passed checkpoints 346, 348, and 350. Additional workloads are also shown.

The checkpoints 346, 348, and 350 may have lines representing a best fit across the various checkpoint data points for the workloads. From even casual observation, the line fitted to checkpoint 346 data appears to be flat and does not change over time, while the line fitted to checkpoint 348 appears to rise, and the line fitted to checkpoint 350 appears to rise even further.

The difference between the slopes of the lines for checkpoint 346 and 348 may indicate that a bottleneck exists between checkpoints 346 and 348, and that the bottleneck grows as time increases. A similar situation may also be present between checkpoints 348 and 350. In some datasets, workloads may be processed in irregular patterns. In the example of embodiment 336, workloads 338 and 340 may be received with a time distance 352, while workloads 342 and 344 may have been received with a shorter time distance 354.

Figure 4:
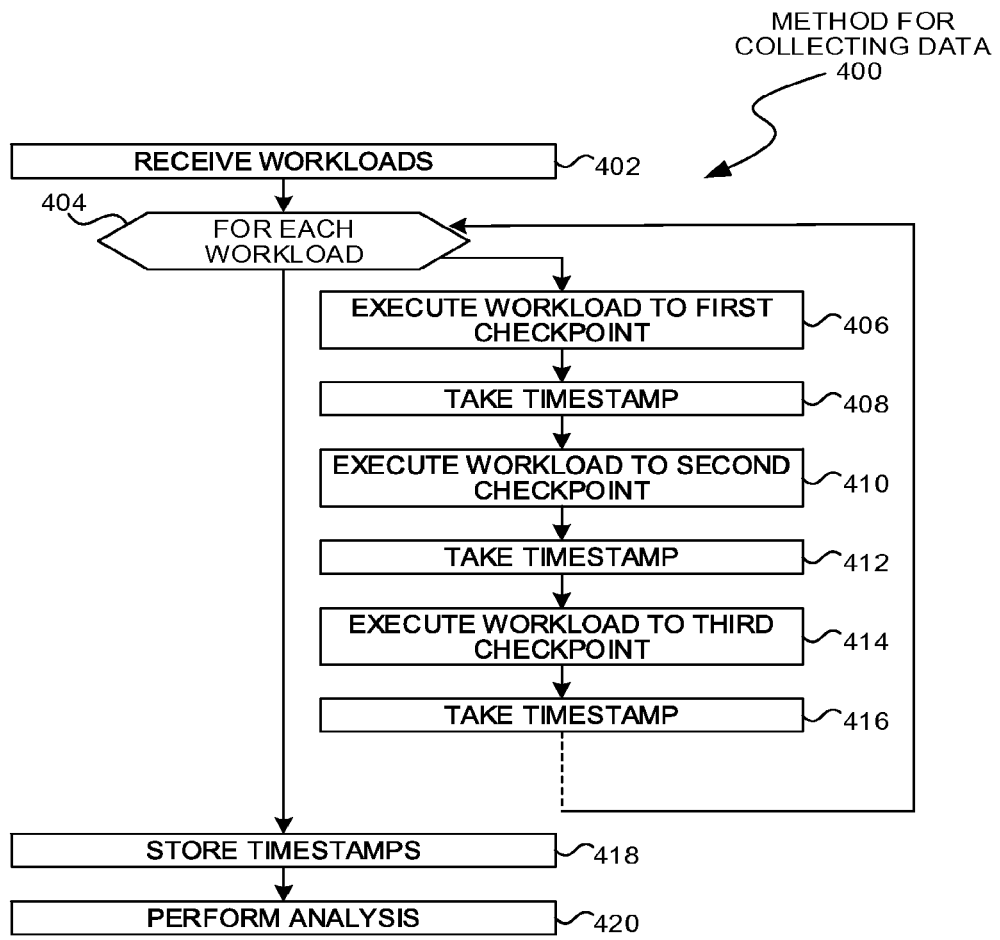
FIG. 4 is a flowchart illustration of an embodiment showing a method for collecting data.

FIG. 4 is a flowchart illustration of an embodiment 400 showing a method for gathering tracer data. The operations of embodiment 400 may illustrate one method that may be performed by the tracers 226 or 254 of embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

A tracer may operate in an execution environment to gather timestamp and other data at each checkpoint. In some cases, the checkpoint may be identified by function calls or other markers in the executable code. In other cases, a checkpoint may be an event, executable code component, or other identifiable element of an executing code.

An execution environment may receive workloads for an application in block 402. For each workload in block 404, the workload may be executed to a first checkpoint in block 406 and timestamp and other data may be taken in block 408. The workload may be executed to a second checkpoint in block 410 and a second timestamp and other data may be taken in block 412. Similarly, the workload may be executed to a third checkpoint in block 414 and a third timestamp and other data may be taken in block 416. The sequence of execution to a checkpoint and collecting data may continue until the workload has finished being processed.

The execution environment may process many workloads in the manner of blocks 406 through 416. In many cases, multiple workloads may be progressing through an application at once.

After collecting all the timestamps and other data, the data may be stored in block 418 and analysis may be performed on the data in block 420.

Figure 5:
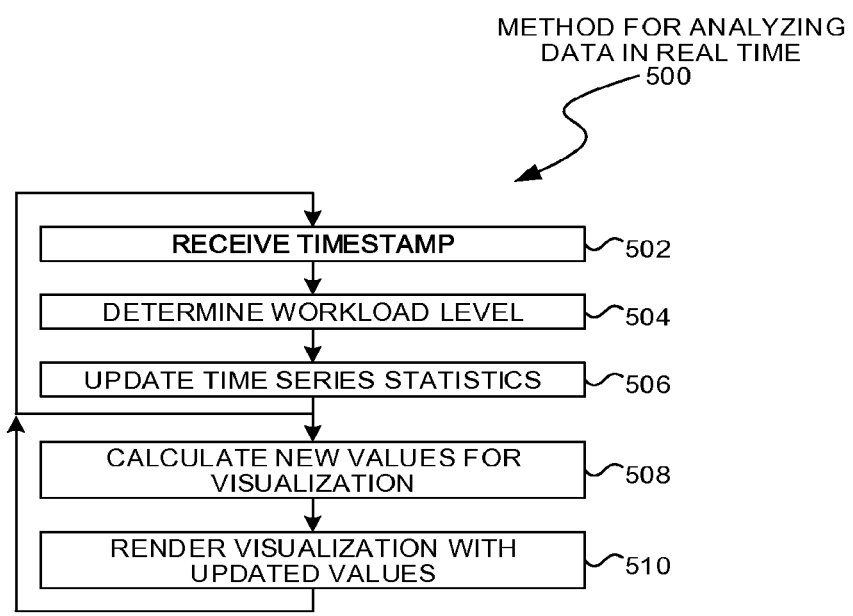
FIG. 5 is a flowchart illustration of an embodiment showing a method for analyzing data in real time.

FIG. 5 is a flowchart illustration of an embodiment 500 showing a method for analyzing tracer data in real time. The operations of embodiment 500 may illustrate one method that may be performed by the data analyzers 230 or 244 of embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 illustrates one method for analyzing tracer data in real time or near-real time. A timestamp may be received in block 502 and a workload level or other data may be determined in block 504. The timestamp may include a workload identifier and checkpoint identifier. In some embodiments, only the workload identifier and checkpoint identifier may be received, and the timestamp may be determined after receiving the data.

In the example of embodiment 500, the timestamp may represent a value in the Y axis and the workload level may represent a value in the X axis, which may be used to generate a graph such as may be shown in embodiment 300.

In the example of embodiment 302 where the X axis represents time, the workload level may not be collected in block 504.

A set of time series statistics may be updated in block 506. The time series statistics may be any type of statistics from which further analyses may be performed. In a simple example of such statistics, the time series statistics may reduce or compress the full trace of X and Y values to the sum of all X values, sum of all Y values, the sum of the square of X values, the sum of the square of Y values, the sum of the product of XY, and the number of samples. From these time series data, linear regression may be performed on the dataset to generate a slope and intercept as well as a correlation coefficient.

In such an embodiment, an analysis may be performed that compares the slope of adjacent checkpoint datasets. When the slope of a later checkpoint diverges or increases from a previous checkpoint, a bottleneck may be identified.

After updating the time series statistics in block 506, the process may loop back to block 502 to process another incoming dataset. Such a loop may be performed relatively quickly, and the remaining blocks 508 and 510 may be performed either offline or in a different thread or process so that the data collection of blocks 502 through 506 may proceed without delay.

In block 508, new values for a visualization graph may be determined and the visualization may be rendered in block 510. In many cases, the calculation and rendering operations of blocks 508 and 510 may consume a relatively large amount of resources than blocks 502 through 506, thus blocks 508 and 510 may be separated.

Figure 6:
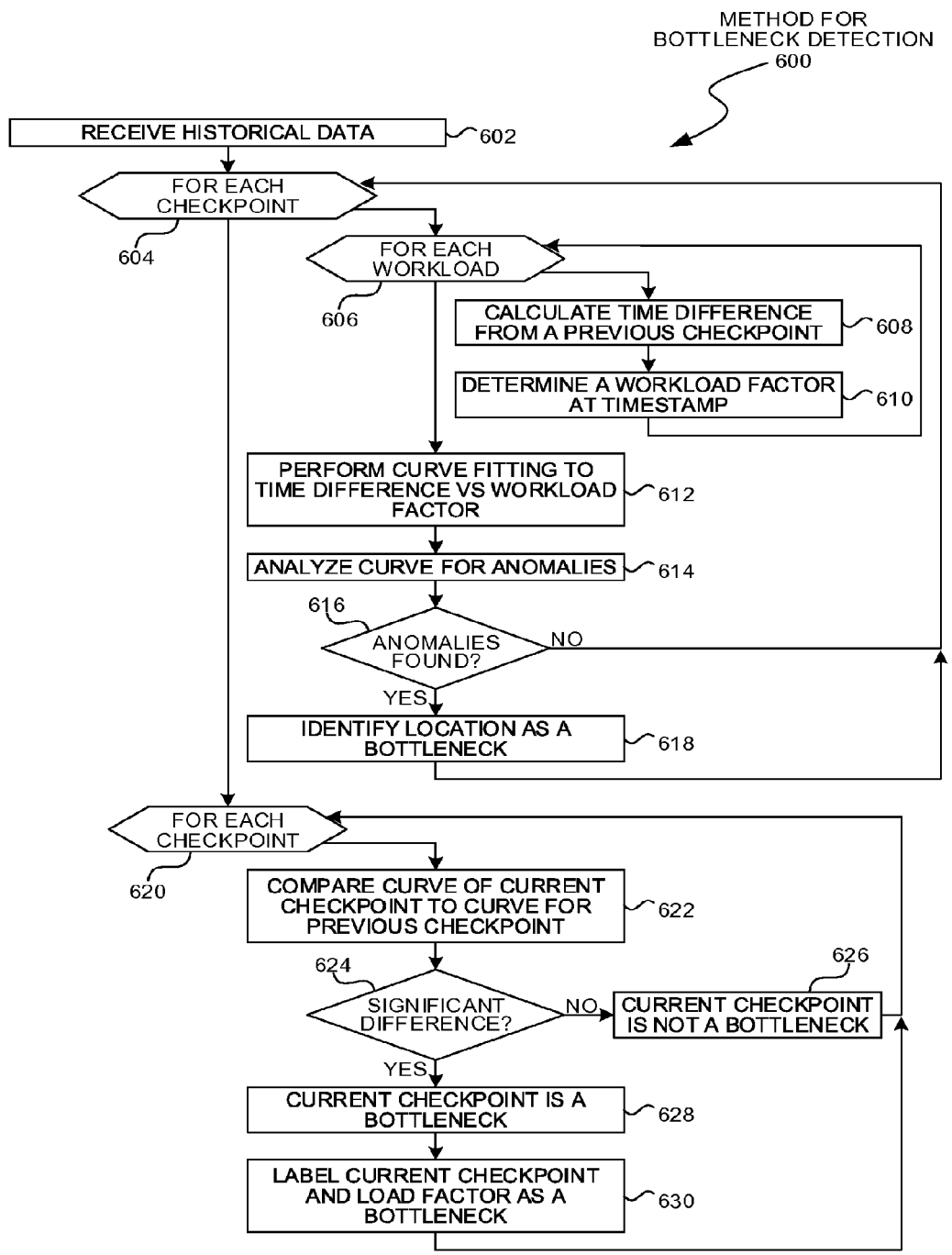
FIG. 6 is a flowchart illustration of an embodiment showing a method for automated bottleneck detection.

FIG. 6 is a flowchart illustration of an embodiment 600 showing a method for detecting bottlenecks from tracer data. The operations of embodiment 600 may illustrate one method that may be performed by the data analyzers 230 or 244 of embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 illustrates a method that analyzes data gathered in a process such as that of embodiment 400 and detects bottlenecks.

Historical data may be received in block 602. The data may be analyzed for each checkpoint in block 604. For a given checkpoint, the data for each workload may be analyzed in block 606.

For each workload, a time difference may be calculated from a previous checkpoint in block 608. The time difference may be calculated from the immediately preceding checkpoint in some embodiments, while other embodiments may calculate the time difference from a start time for the workload.

In block 610, a workload factor may be identified for the time corresponding to the timestamp of the current workload at the current checkpoint. The workload factor may be used in embodiments where the analysis may be performed on historical data. In an embodiment such as embodiment 302 where the X axis of a graph may be time, a workload factor may not be used.

After preparing the data in blocks 606 through 610, a curve fitting analysis may be performed. In some cases, the curve fitting may be performed against a load factor, while in other cases, the curve fitting may be performed against time.

An analysis of the fitted curve may be performed in block 614 for any anomalies. An anomaly may be a very high correlation coefficient in a linear curve fitting attempt, an inflection point in a more complicated curve fitting method, or some other indicator that that data may not be adequately represented by a line. When an anomaly is not detected in block 616, the checkpoint curve may not reveal a bottleneck. When an anomaly is detected in block 616, the location may be labeled as a bottleneck.

The analysis of blocks 604 through 618 may analyze the data at each checkpoint to attempt to identify a bottleneck. The analysis from blocks 620 through 630 may attempt to identify bottlenecks by comparing two checkpoint data streams to each other.

For each checkpoint in block 620, the curve of the current checkpoint is compared to the curve of the previous, upstream checkpoint in block 622. The comparison in block 622 may compare the slope of one checkpoint dataset to the slope of a second checkpoint dataset. In such embodiments, a diverging slope may indicate that a later checkpoint contains a bottleneck with respect to the previous checkpoint.

In other embodiments where the curve fitting is a more complex expression, the comparison may detect whether both checkpoint curves are offset or parallel to each other. Diverging data sets may indicate that the later checkpoint may contain a bottleneck with respect to the earlier checkpoint.

When the difference between the two curves is not significant in block 624, the current checkpoint may not be considered as a bottleneck in block 626.

When the difference between the two curves is significant in block 624, the current checkpoint may be considered to have a bottleneck in block 628, and the checkpoint may be labeled as a bottleneck in block 630.

Figure 7:
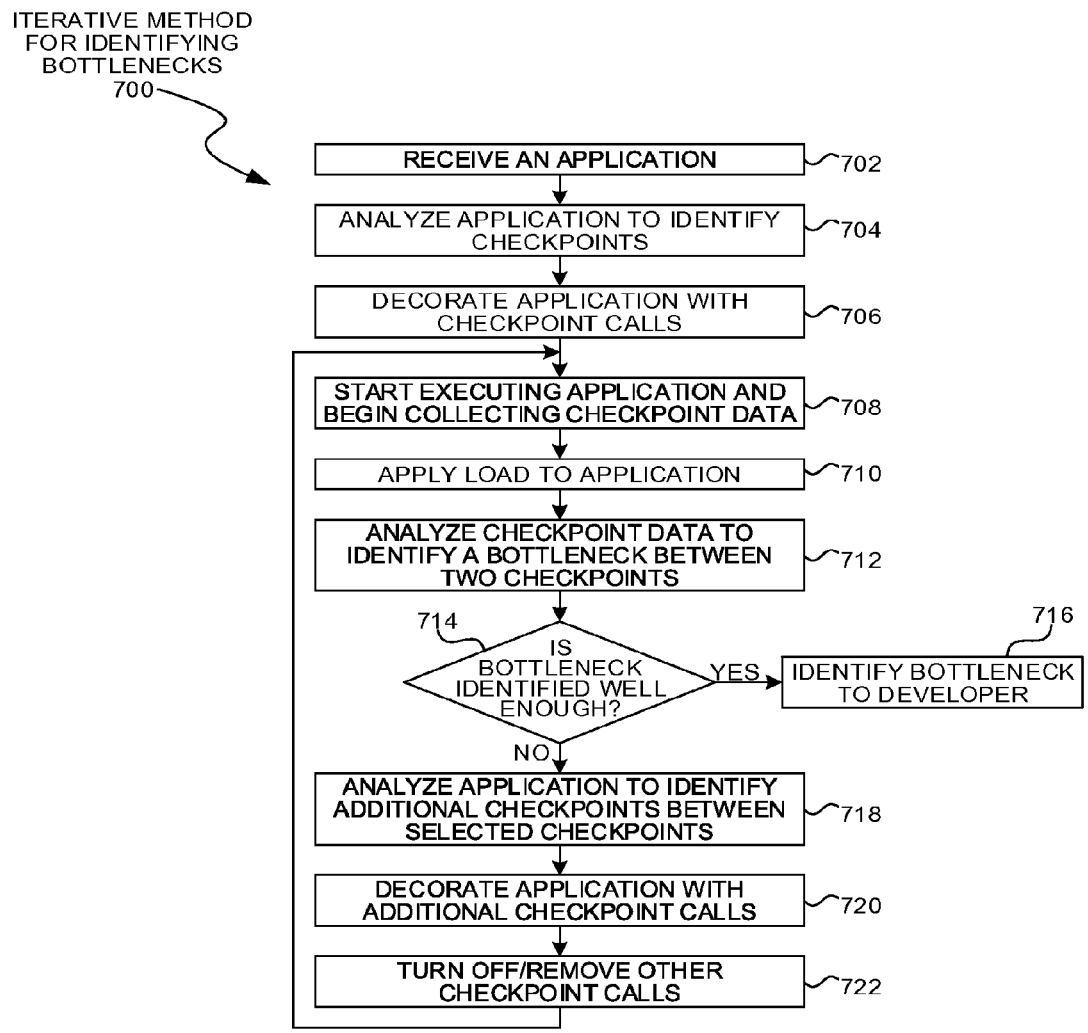
FIG. 7 is a flowchart illustration of an embodiment showing a method for iterating to pinpoint a bottleneck.

FIG. 7 is a flowchart illustration of an embodiment 700 showing an iterative method for detecting bottlenecks from a running application. The operations of embodiment 700 may illustrate one method that may be performed by the tracer manager 240 of embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 700 is an example of an iterative method to identify a bottleneck with a high degree of specificity. Embodiment 700 is an example of a method by which a relatively small number of checkpoints may be spread through an application, and when a bottleneck is detected between two of the checkpoints, another set of checkpoints may be placed in the area of the application between the checkpoints and the process may be repeated.

The method of embodiment 700 may iterate repeatedly to find a bottleneck with a high degree of specificity. Such specificity may be at the level of a single function call or even a specific line of an application, depending on the embodiment.

In block 702, an application may be received. The application may be analyzed in block 704 to identify checkpoints, and the checkpoints may be added to the application in block 706.

In some embodiments, the checkpoints in block 704 may be 'natural' locations in an application where a checkpoint may be relevant. Examples of such locations may be at function calls or other points within the application. In other embodiments, the checkpoints may be identified by merely spacing the checkpoints within the application code by a predefined number of instruction lines or some other method.

The application may begin execution in block 708 and data may start to be collected. In block 710, a load may be applied, which may be an artificial load or a natural load in a production system.

The checkpoint data may be analyzed to identify a bottleneck in block 712. In some cases, the application may be driven with ever increasing loads until a bottleneck becomes apparent.

If the bottleneck is identified in block 712 but the bottleneck is not identified with enough specificity in block 714, an additional set of checkpoints may be determined in block 718 and added to the application in block 720. The older checkpoints may be removed or turned off in block 722, and the process may return to block 708 to iterate again.

The iterations may continue with smaller and smaller spacing between checkpoints until the bottleneck is defined with sufficient specificity in block 714, at which point the iterations may stop and the bottleneck may be identified for the developer in block 716.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A computing system comprising:
   memory containing executable code;
   one or more processors, which, when executing the executable code, cause the computing system to be configured with a system architecture for analyzing workloads processed when executing an application in order to identify a bottleneck where time to execute a workload between two checkpoints increases at a greater rate than the workload increases, and wherein the system architecture comprises:
      a checkpoint inserter that analyzes the application to identify a plurality of locations for checkpoints, and inserts a checkpoint function call that causes a checkpoint identifier and a timestamp to be captured for each inserted checkpoint;
      an execution environment that executes the application in accordance with a workload;
      a tracer that responds to the checkpoint function call inserted for each location, and that captures checkpoint identifiers, timestamps, and workload factors for each of said identified checkpoint locations as the application executes;
      an analyzer that performs the following computer-implemented method:
         identifies a plurality of checkpoints in the application; and
         identifies a bottleneck in the executing application by performing a curve fitting analysis for each checkpoint based on one or the other of the workload factor or a time difference based on the timestamp of a current checkpoint as compared to the timestamp of the previous checkpoint, and then analyzes a determined curve by performing one or the other of the following:
            (1) analyzing a determined curve for a given checkpoint to determine any anomalies, and if so, identifying the given checkpoint as a bottleneck in the executing application; or
            (2) comparing a determined first curve for a given checkpoint to a second curve for a previous checkpoint to determine any significant differences between the two curves for the current and previous checkpoints, and if so, identifying the given checkpoint as a bottleneck in the executing application.

2. The system of claim 1, wherein said tracer returns a workload identifier in response to each said checkpoint function call.

3. The system of claim 1, wherein said tracer receives a workload identifier with said checkpoint function call.

4. The system of claim 1, wherein said timestamp is transmitted with each said checkpoint function call.

5. The system of claim 1, wherein said timestamp is determined when said checkpoint function call is received.

6. The system of claim 1, wherein said any significant differences between the two curves is based on said first curve having a different slope from said second curve.

7. The system of claim 1, wherein said any significant differences between the two curves is based on said first curve having a different correlation coefficient than said second curve.

8. The system of claim 1, wherein said first curve is a linear curve.

9. The system of claim 1, wherein said first curve is a polynomial curve.

10. The system of claim 1, wherein said timestamp is an incremental time from a beginning time.

11. The system of claim 1, wherein said first curve correlates said timestamp with a load factor.

12. The system of claim 1, wherein said load factor is received as a data stream comprising timestamps.

13. A computer-implemented method for analyzing workloads processed when executing an application in order to identify a bottleneck where time to execute a workload between two checkpoints increases at a greater rate than the workload increases, the computer-implemented method comprising:
   analyzing the application to identify a plurality of locations for checkpoints, and inserting a checkpoint function call that causes a checkpoint identifier and a timestamp to be captured for each inserted checkpoint;
   executing the application in accordance with a workload;
   tracing the application as it executes in accordance with the workload, and as a result of the tracing, capturing tracer data that comprises checkpoint identifiers, timestamps, and workload factors for each of said identified checkpoint locations as the application executes;
   based on the tracer data, identifying a plurality of checkpoints in the application; and
   identifying a bottleneck in the executing application by performing a curve fitting analysis for each checkpoint based on one or the other of the workload factor or a time difference based on the timestamp of a current checkpoint as compared to the timestamp of the previous checkpoint, and then analyzing a determined curve by performing one or the other of the following:
(1) analyzing a determined curve for a given checkpoint to determine any anomalies, and if so, identifying the given checkpoint as a bottleneck in the executing application; or
(2) comparing a determined first curve for a given checkpoint to a second curve for a previous checkpoint to determine any significant differences between the curves for the current and previous checkpoints, and if so, identifying the given checkpoint as a bottleneck in the executing application.

14. The computer-implemented method of claim 13, wherein a workload identifier is returned in response to each said checkpoint function call.

15. The computer-implemented method of claim 13, wherein a workload identifier is received with each said checkpoint function call.

16. The computer-implemented method of claim 13, wherein said timestamp is transmitted with each said checkpoint function call.

17. The computer-implemented method of claim 13, wherein said timestamp is determined when said checkpoint function call is received.

18. The computer-implemented method of claim 13, wherein said any significant differences between the two curves is based on said first curve having a different slope from said second curve.

19. The computer-implemented method of claim 13, wherein said any significant differences between the two curves is based on said first curve having a different correlation coefficient than said second curve.

20. The computer-implemented method of claim 13, wherein said first curve is a linear curve.

21. The computer-implemented method of claim 13, wherein said first curve is a polynomial curve.

22. The computer-implemented method of claim 13, wherein said timestamp is an incremental time from a beginning time.

23. The computer-implemented method of claim 13, wherein said first curve correlates said timestamp with a load factor.

24. The computer-implemented method of claim 13, wherein said load factor is received as a data stream comprising timestamps.

\* \* \* \* \*